Oct. 14, 1958 — E. GALLI — 2,855,906
TURBULENCE GENERATING DEVICE FOR
INTERNAL COMBUSTION ENGINES
Filed Dec. 10, 1954
FIG. 1
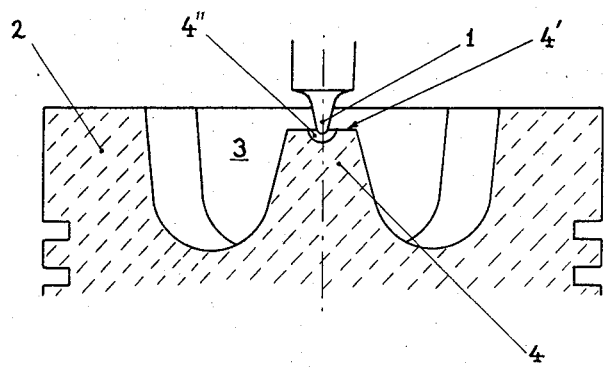
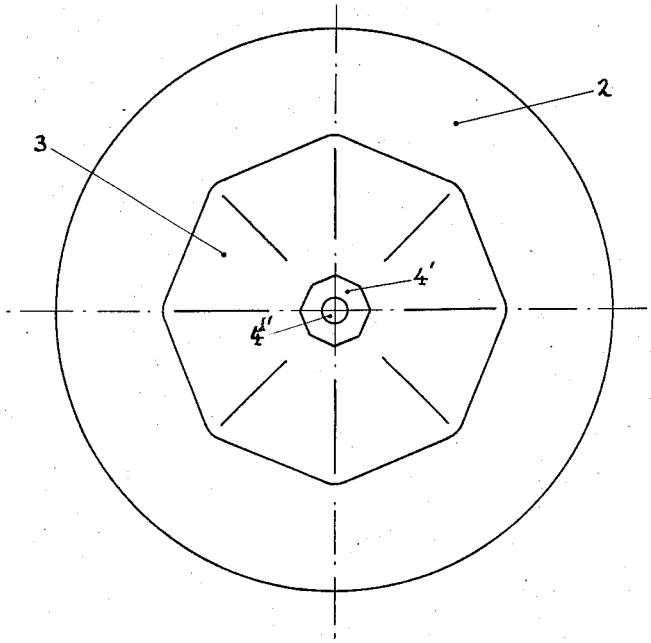
FIG. 2
INVENTOR
ERCOLE GALLI
BY
ATTORNEYS United States Patent Office 2,855,906
Patented Oct. 14, 1958

2,855,906

TURBULENCE GENERATING DEVICE FOR INTERNAL COMBUSTION ENGINES

Ercole Galli, Turin, Italy

Application December 10, 1954, Serial No. 474,366

Claims priority, application Italy April 16, 1954

2 Claims. (Cl. 123—32)

This invention relates to a process for generating turbulence in the combustion chamber of an internal combustion engine.

It is well known that carbonaceous incrustations are deposited on the walls of the combustion chambers of internal combustion engines. Such incrustations are due to cracking and imperfect combustion of the fuel injected, and to oil stains adhering to the walls. The incrustations are particularly abundant around the injector nozzle and on that part of the piston or cylinder head opposed thereto. In such positions, moreover, the incrustations are particularly harmful because they may succeed in obstructing the injection duct partially, or interfere with the outward flow of the fuel.

The present invention has for an object to provide an improvement in the known systems for generating turbulence in the liquid contained in the combustion chamber, whereby part of the kinetic energy possessed by the turbulent fluid may be used to continually remove the carbonaceous residues that are deposited around the nozzle and on the wall facing it, thus avoiding an accumulation of such residues and the formation of incrustations.

According to the invention, we provide a process for generating turbulence in the combustion chamber of an internal combustion engine, in which the jet of injected fuel is deviated by the compression wave proceeding from a wall facing the injection hole at a relatively short distance therefrom, so that said compression wave may skim over the injection nozzle to deterge and cool same.

The invention will now be described, by way of example, with reference to the accompanying drawings, in which:

Fig. 1 is a fragmentary axial section of a piston head of an internal combustion engine showing the arrangement of the combustion chamber and injector for carrying out the process of the invention, and Fig. 2 is a plan view of the piston head.

The injector nozzle 1 may be of a substantially well-known type, or may be modified in shape with a view to making the most of the cleansing characteristics of the process, or for the purpose of deflecting the turbulence currents as desired.

The piston 2 may be of known type also, with the exception of the combustion chamber 3, which is formed in the piston head. Said chamber 3 is of an irregular type, preferably but not necessary with polygonal outlines. The central upstanding projection 4 facing the injection duct, is not limited to the small elevation which is usually used to drive or direct the turbulence current of the mixture in combustion, but on the contrary extends upwards to the level of the lower end of the injector nozzle or a level adjacent thereto. In the upper surface 4' of the projection 4, a semispherical or cylindrical cavity 4" is formed, in such a manner as to surround the lower end of the nozzle 1 closely, when the piston is at the end of its upward stroke.

The above-described configuration of the piston head has not the small effect which might be expected from a simple variation of the proportions of same in comparison with normal piston heads. On the contrary, it has a surprisingly large influence on the jet of fuel during the injection operation, inasmuch as the wall facing the nozzle (and usually at such a distance therefrom that the compression wave provoked by the advance of the wall has no direct action on the jet of fuel) is brought sufficiently close to the nozzle to cause the compression wave generated and reflected by the wall to act on the jet of fuel, deviating and dispersing it.

The fluid current resulting from such a compressing wave skims both the surface that generates it and the outer surface of the nozzle, mechanically removing the carbonaceous waste and facilitating the combustion thereof, whereby an accumulation of such waste is avoided.

It will be understood that a configuration of the cavity 4" and of the external area of the injector allows one to cause the jet to divide into particular characteristics of form, direction, velocity, turbulence and dispersion, in such a way as to exert a useful influence on the course of the combustion, and particularly to favour the regularity and rapidity of the combustion.

Naturally, the embodiment illustrated is not at all limitative, as it might, even should, vary according to the characteristics desired for the combustion, on the sole condition that, at a short distance from the injector nozzle, there be a surface forming part of the piston, or of the cylinder, or of some other part of the engine integral with the piston or cylinder, and adapted to send to the nozzle a fluid current that will deterge same, and, in cooperation therewith, emit the fuel jet in favourable conditions to the combustion chamber.

What I claim is:

1. A piston for an internal combustion engine having an injector nozzle comprising a piston head having an upper surface including a central upstanding projection with a horizontal upper surface and a small central depression adjacent the nozzle in said projection and a circumferentially-extending chamber formed by a wall of the upstanding projection and a peripheral wall of the piston head, said chamber having a curved bottom portion.

2. A turbulence generating device for the injector of an internal combustion engine of the type having a piston the head end of which, at the end of its compression stroke, is positioned very near the injection nozzle, said piston having a deep cavity, a projection extending from the bottom of the cavity and terminating in a flat wall adjacent the injector, a small cavity in said wall into which the injector nozzle penetrates, said projection having a sharp edge formed by the meeting of the flat wall with a peripheral wall of the projection.

References Cited in the file of this patent

UNITED STATES PATENTS

| | | |
|---|---|---|
| 1,693,966 | Sperry | Dec. 4, 1928 |
| 2,046,263 | Hesselman | June 30, 1936 |
| 2,505,999 | Smith | May 2, 1950 |
| 2,556,773 | Nichols | June 12, 1951 |
| 2,709,992 | Graves | June 7, 1955 |

FOREIGN PATENTS

| | | |
|---|---|---|
| 365,751 | Germany | Dec. 21, 1922 |
| 40,295 | Denmark | June 10, 1929 |
| 1,035,539 | France | Apr. 15, 1953 |
| 710,094 | Great Britain | June 9, 1954 |